United States Patent [19]
Mimura

[11] Patent Number: 5,788,210
[45] Date of Patent: Aug. 4, 1998

[54] MOTOR MOUNTING STRUCTURE

[75] Inventor: Naohisa Mimura, Hamamatsu, Japan

[73] Assignee: ASMO Co, Ltd., Kosai, Japan

[21] Appl. No.: 352,712

[22] Filed: Dec. 5, 1994

[30] Foreign Application Priority Data

Dec. 24, 1993 [JP] Japan ................. 5-327926

[51] Int. Cl.$^6$ ................................................ F16H 1/00
[52] U.S. Cl. ................................................ 248/612
[58] Field of Search ........................ 248/637, 672, 248/666, 674; 384/542, 537

[56] References Cited

U.S. PATENT DOCUMENTS

| | | | |
|---|---|---|---|
| 1,816,460 | 7/1931 | Aller | 384/537 |
| 3,033,622 | 5/1962 | Renner | 384/537 |
| 3,637,272 | 1/1972 | Christiansen | 384/542 |
| 3,757,147 | 9/1973 | Lyman | 310/49 |
| 4,386,812 | 6/1983 | Anderson | 384/542 |
| 4,506,590 | 3/1985 | Miki | 91/35 |
| 4,593,217 | 6/1986 | Levine | 310/90 |
| 4,980,587 | 12/1990 | Yonei | 310/67 R |
| 5,166,565 | 11/1992 | Katsuzawa | 310/90 |
| 5,220,844 | 6/1993 | Mills | 248/666 |
| 5,310,034 | 5/1994 | Bernabei | 248/674 |

FOREIGN PATENT DOCUMENTS

| | | |
|---|---|---|
| 62-16154 | 1/1989 | Japan . |
| 2-53246 | 4/1990 | Japan . |
| 2-142956 | 12/1990 | Japan . |
| 1816460 | 8/1930 | United Kingdom .......... 384/542 |

Primary Examiner—Leslie A. Braun
Assistant Examiner—Gwendolyn W. Baxter
Attorney, Agent, or Firm—Burns, Doane, Swecker & Mathis, LLP

[57] ABSTRACT

A motor mounting structure is disclosed, by which a central axial line of output shaft can be maintained at the optimum axial position when the motor is mounted on an external device without finishing the motor with high precision. Motor is mounted on actuator by inserting output shaft of motor in insert hole of actuator and fitting the exposed part of radial bearing in engaging recess. In addition, since the engaging surface of engaging recess is finished with high precision relative to radial bearing which have already been finished with high precision, the axial line position of output shaft of motor is brought to the optimum axial line position when motor is mounted on actuator. Therefore, motor can be positioned and connected without finishing the external peripheral surface of body case with high precision.

15 Claims, 7 Drawing Sheets

MOTOR MOUNTING STRUCTURE

CROSS REFERENCE TO RELATED APPLICATIONS

This application is based upon and claims priority from Japanese Patent Application 5-327926, filed Dec. 24, 1993, the contents of which are incorporated herein by reference.

BACKGROUND OF THE INVENTION

1. Field of the Invention

This present invention relates to a motor mounting structure.

2. Related Art

Figure 13:
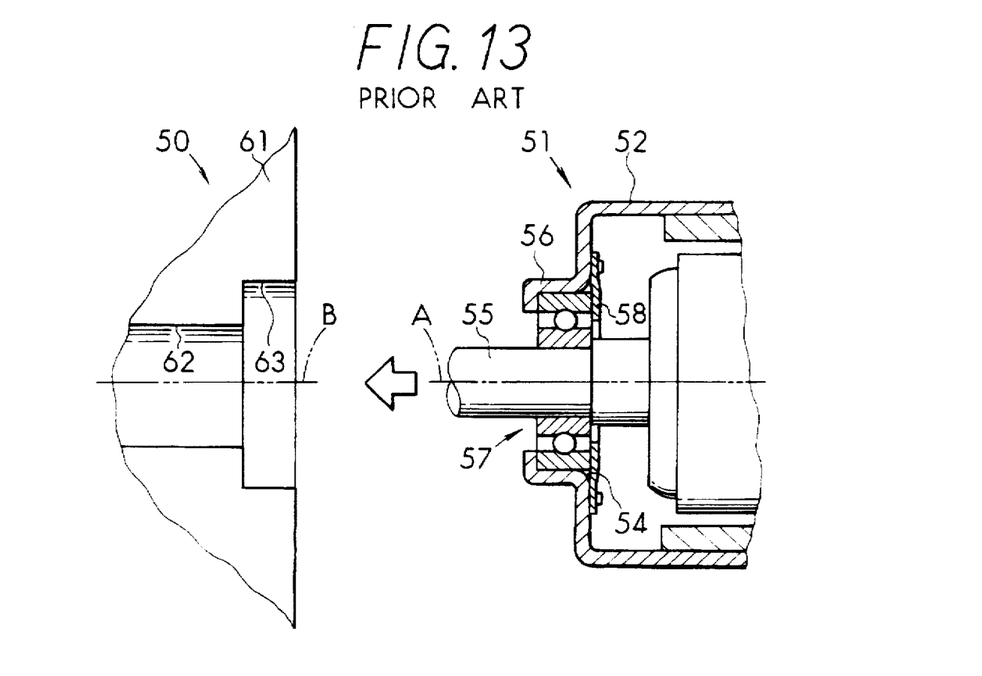
FIG. 13 is a sectional view of conventional structure of motor and actuator housing.

As shown by FIG. 13, for example, in a conventional motor structure, a motor 51, which drives an actuator, has a through hole 54 formed at one side of a body case 52, through which an output shaft 55 passes. In addition, a cylindrical restrictor 56 extends from the outside opening of through hole 54 toward the outside of motor 51 and the end of restrictor 56 is formed to bend toward the output shaft 55. Further, a radial bearing 57 is disposed between the output shaft 55 and the restrictor 56. Radial bearing 57 is retained between a stopper plate 58 fixed at the inside of body case 52 and the restrictor 56.

On the other hand, an insert hole 62 to pass the output shaft 55 of motor 51 is formed on a housing 61 of an actuator 50 and extends up to an input shaft which is not shown in the figure. At the outside opening of insert hole 62, an engaging recess 63 having the same diameter as the stopper 56 is formed. Therefore, the motor 51 is mounted on the actuator 50 by inserting the output shaft 55 of motor 51 in the insert hole 62 of actuator 50 as shown by arrow and, at the same time, fitting the restrictor 56 of body case 52 into the engaging recess 63. At this time, the output shaft 55 of motor 51 is connected to the input shaft (not shown) of actuator 50.

When the motor 51 is mounted on the actuator 50, it is necessary to connect the output shaft 55 of motor 51 to the input shaft of actuator 50 in an optimum condition. Therefore, it is necessary to finish the internal peripheral surface of engaging recess 63 and the internal and external peripheral surfaces of restrictor 56 with a high precision in order to assure placement of the central axial line A of output shaft 55 at the optimum axial line position B as shown by FIG. 13, when the motor 51 is mounted on the actuator 50. The optimum axial line position B means the central axial line position of output shaft 55 which is obtained when the output shaft 55 of motor 51 and the input shaft of actuator 50 are connected in the optimum condition.

However, there was a problem that the manufacturing cost increases because it needs large expenses and labor in order to finish the internal peripheral surface of engaging recess 63 and the internal and external peripheral surfaces of restrictor 56 with a higher precision.

SUMMARY OF THE INVENTION

The present invention intends to solve the abovementioned problem and its object is to provide a motor mounting structure which allows, without finishing a motor with higher precision, to retain a central axial line of output shaft at an optimum axial line position when the motor is mounted on an external device.

According to the present invention, a motor is mounted on an external device by fitting an exposed section of radial bearing of the motor in an engaging recess of external device. When the motor is mounted on the external device, the axial line of motor output shaft becomes the optimum axial line position.

Preferably, the motor is mounted on the external device by fitting the exposed section of radial bearing of the motor in the engaging recess of external device. When the motor is mounted on the external device, the axial line position of motor output shaft becomes the optimum axial line position. In addition, when the motor is mounted on the external device, the load applied to the radial bearing is subjected to a housing of external device.

More preferably, the motor is mounted on the external device by fitting the external device side on an external peripheral surface of radial bearing in the engaging recess of external device. When the motor is mounted on the external device, the axial line position of motor output shaft becomes the optimum axial line position. In addition, since the motor side only of radial bearing is supported with the restrictor piece, the engaging area between the radial bearing and the engaging recess becomes larger. As a result, when the motor is mounted on the external device, the axial line position of motor output shaft becomes more positively at the optimum axial line position.

More preferably, the motor is mounted on the external device by fitting the exposed section of the radial bearing in the engaging recess of external device. The bearing is supported by the restriction piece and a stopper piece both extending from the motor case.

More preferably, the motor is mounted on the external device by fitting the exposed sections of both radial bearings mounted on the motor output shaft in the engaging recess of external device. When the motor is mounted on the external device, the axial line position of motor output shaft becomes the optimum axial line position. In addition, the motor output shaft is supported by a plural number of radial bearings in the engaging recess.

More preferably, the motor is mounted on the external device by inserting the motor output shaft in the radial bearing fitted in the engaging recess of external device. When the motor is mounted on the external device, the axial line position of output shaft becomes the optimum axial line position. In addition, since the radial bearing is fitted in the engaging section of external device, it is not necessary to provide a radial bearing at the motor side.

BRIEF DESCRIPTION OF THE DRAWINGS

Other objects, features and characteristics of the present invention will be appreciated from a study of the following detailed description, the appended claims, and drawings, all of which form a part of this application. In the accompanying drawings:

DETAILED DESCRIPTION OF THE PRESENTLY PREFERRED EXEMPLARY EMBODIMENTS

Hereinafter the first embodiment of the present invention is described with reference to FIG. 1 through FIG. 5.

Figure 1:
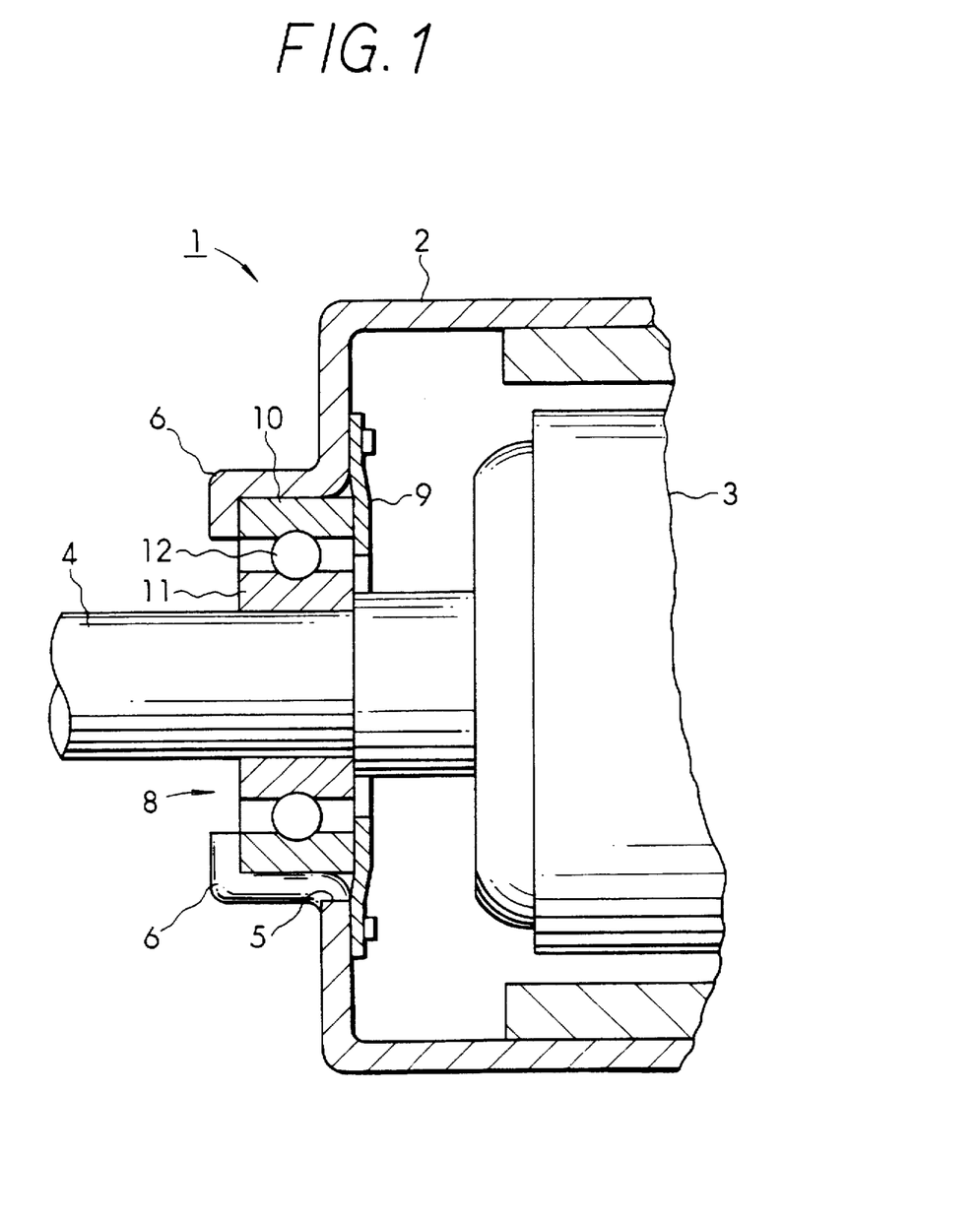
FIG. 1 is a sectional view of a part of a motor according to the first embodiment taken along the line I—I in FIG. 2.
Figure 2:
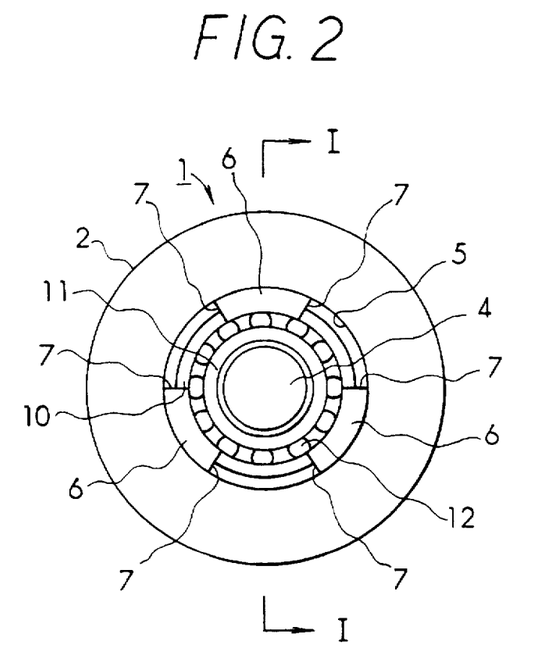
FIG. 2 is a front elevation of the motor of first embodiment.

As shown by FIG. 1 and FIG. 2, a through hole 5 through which penetrates an output shaft 4 extending from an armature 3, is formed on a body case 2 of a motor 1. Three restrictor pieces 6 are formed to extend from the outside opening of the through hole 5 toward the outside of motor 1 and slits 7 are formed between respective restrictor pieces 6. In addition, the end of each restrictor piece 6 is formed to bend toward the side of output shaft 4.

Further, a radial bearing 8 is disposed between the output shaft 4 and the restrictor piece 6 and the outside diameter surface of radial bearing 8 is exposed through the restrictor piece 6 via the slit 7. In addition, the radial bearing 8 is retained between a stopper plate 9 and the restrictor piece 6 by the stopper plate 9 which is secured on the inside of body case 2.

The radial bearing 8 is composed of an outer ring 10, an inner ring 11 having a diameter smaller than that of outer ring 10 and balls 12 disposed between the outer ring 10 and the inner ring 11. The output shaft 4 passes through the center of the inner ring 11 so that the inner ring 11 rotates along with the rotation of output shaft 4 and the balls 12 roll between the outer ring 10 and the inner ring 11. In addition, the outer ring 10 and the inner ring 11 are shaped in tubular forms which have their centers on the axial line of output shaft 4, in order to rotate the output shaft 4 efficiently.

Figure 3:
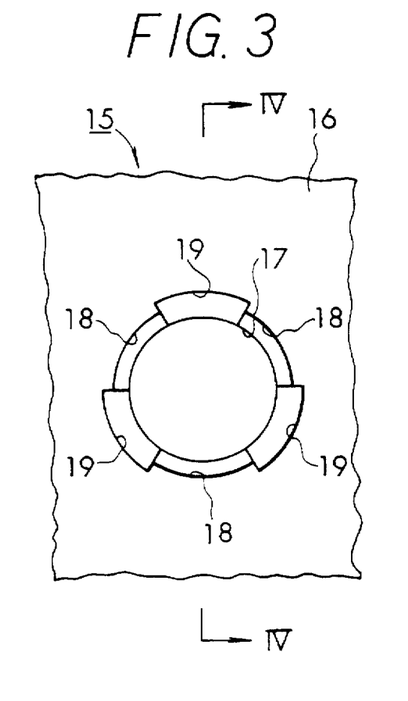
FIG. 3 is a front elevation which shows an insert hole and an engaging recess as well as an accommodating groove of an actuator of first embodiment.
Figure 4:
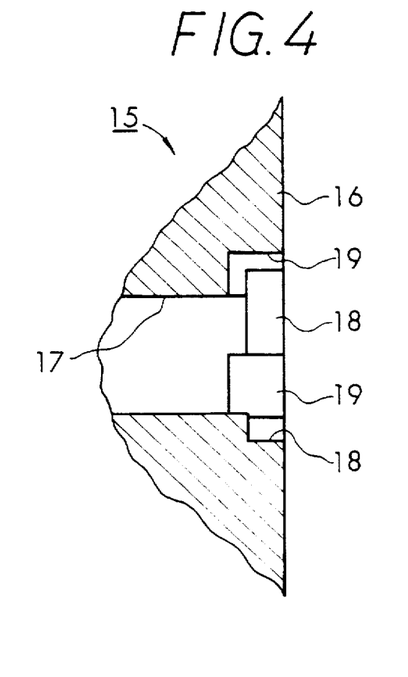
FIG. 4 is a sectional view viewed taken along the line IV—IV of the insert hole and the engaging recess as well as the accommodating groove which are shown in FIG. 3.

On the other hand, as shown by FIG. 3 and FIG. 4, an insert hole 17 to insert the output shaft 4 of motor 1 is formed on a housing 16 of actuator 15 and the insert hole 17 extends to an input shaft, which is not shown in the figure, of actuator 15. At the outside opening of insert hole 17, an engaging recess 18 which has the same diameter as the radial bearing 8 with the difference within the range of a few scores of microns, is formed. On the internal peripheral surface of the engaging recess 18, three accommodating grooves 19 are formed at the position corresponding to each restrictor piece 6 in the same direction as the protrusion of each restrictor piece 6. The accommodating grooves 19 are formed a little larger than each restrictor piece 6 to accommodate each restrictor piece.

The engaging recess 18 is designed to allow the radial bearing 8 to be fitted therein. Further, when the engaging recess 18 and the radial bearing 8 are engaged with each other, the output shaft 4 of motor 1 is connected to the input shaft, which is not shown, of actuator 15 in the optimum condition. In other words, the internal peripheral surface of the engaging recess 18 is finished with a high accuracy relative to the radial bearing 8 and, when the motor 1 is mounted on the actuator 15, the output shaft 4 of motor 1 is designed to be connected to the input shaft, not shown, in the optimum condition.

Next, the operation of the motor 1 and the actuator 15 which are constructed as above is described.

Figure 5:
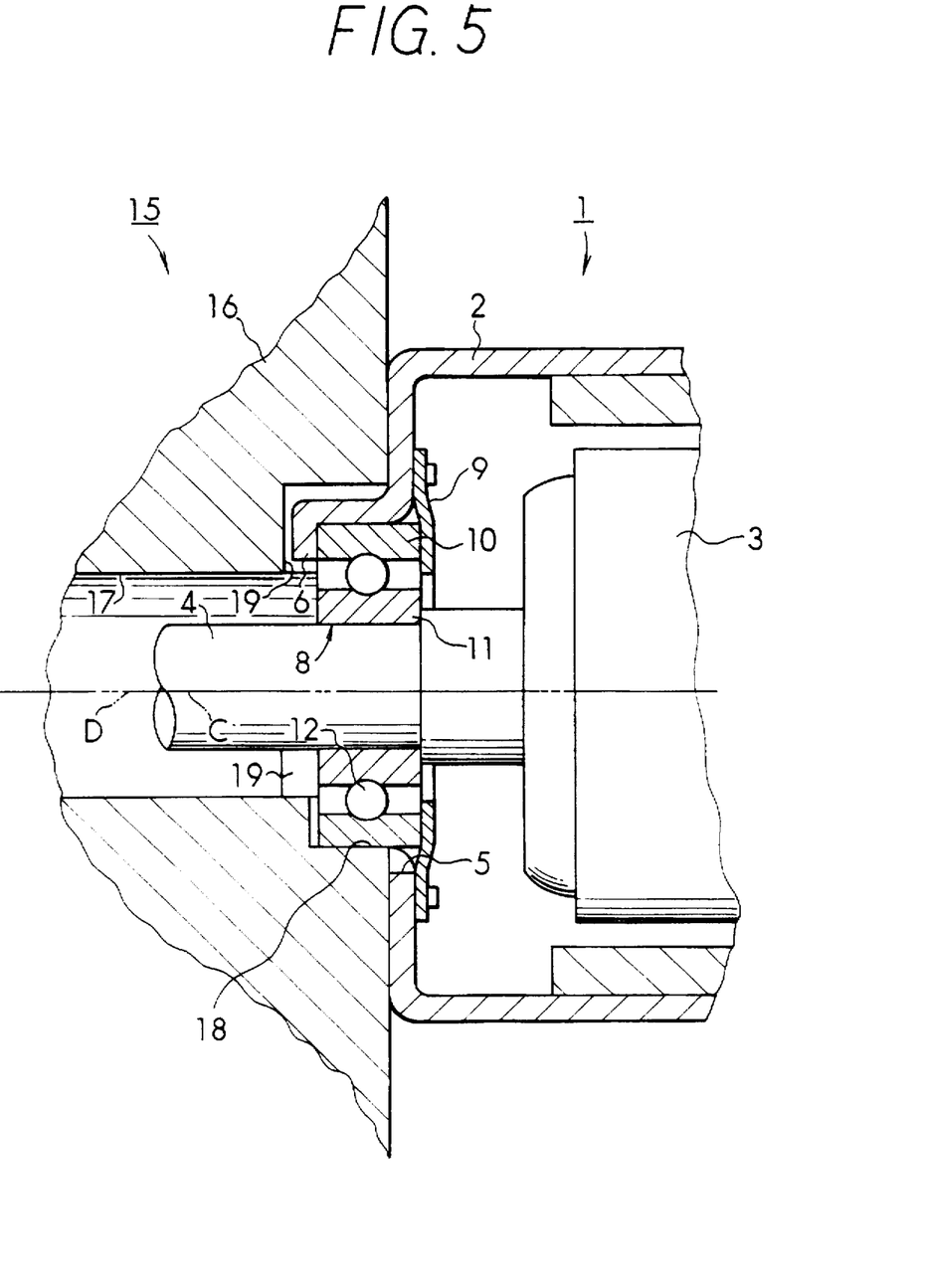
FIG. 5 is a sectional view which shows the way in which the motor is mounted on the actuator.

When the motor 1 is mounted on the actuator 15, the output shaft 4 of motor 1 is inserted at first in the insert hole 17 of actuator 15 and then each restrictor piece 6 is disposed in the position which corresponds to each accommodating groove 19. In addition, each restrictor piece 6 is inserted in the corresponding accommodating groove 19 and at the same time the radial bearing 8 is fitted in the engaging recess 18 so that the motor 1 is mounted on the actuator 15 as shown by FIG. 5. At this time, the part of outer ring 10 of radial bearing 8 which is exposed through the slit 7 is fitted in the engaging recess 18.

Since the internal peripheral surface of engaging recess 18 is formed with higher precision relative to the radial bearing 8, the output shaft 4 of motor 1, which is mounted on the actuator 15, is connected to the input shaft of actuator 15 in the optimum condition. In other words, when the motor 1 is mounted on the actuator 15, the center of axial line C of output shaft 4 agrees with the optimum axial line position D. It is to be noted that the optimum axial line position D is the central axial line position of output shaft 4 when the output shaft 4 of motor 1 is connected to the input shaft of actuator 15 in the optimum condition.

In this embodiment, as described above, the motor 1 is mounted on the actuator 15 by fitting the radial bearing 8 which has already been finished with a higher precision, in the engaging recess 18 which has been finished with a higher precision relative to the radial bearing 8. Accordingly, when the motor 1 is mounted on the actuator 15, the central axial line C of output shaft 4 can be maintained at the optimum axial line position D.

Moreover, since the radial bearing 8 which has already been finished with high precision is fitted in the engaging recess 18, it becomes unnecessary to finish the external peripheral surface of joint section of body case 2 with high precision and at the same time the motor 1 can be positioned and connected without an error. As a result, the manufacturing cost of motor 1 can be reduced.

Moreover, since, in this embodiment, the load borne by the radial bearing 8 is supported with the housing 16 of actuator 15 the same as the conventional method, the strength to mount the motor 1 can be maintained notwithstanding the low manufacturing cost of motor 1.

Next, a second embodiment of the present invention is described with reference to FIG. 6 and FIG. 7. The same numerals are used where the same sections as in the first embodiment are used and a detailed explanation on such sections is abbreviated for brevity.

Figure 6:
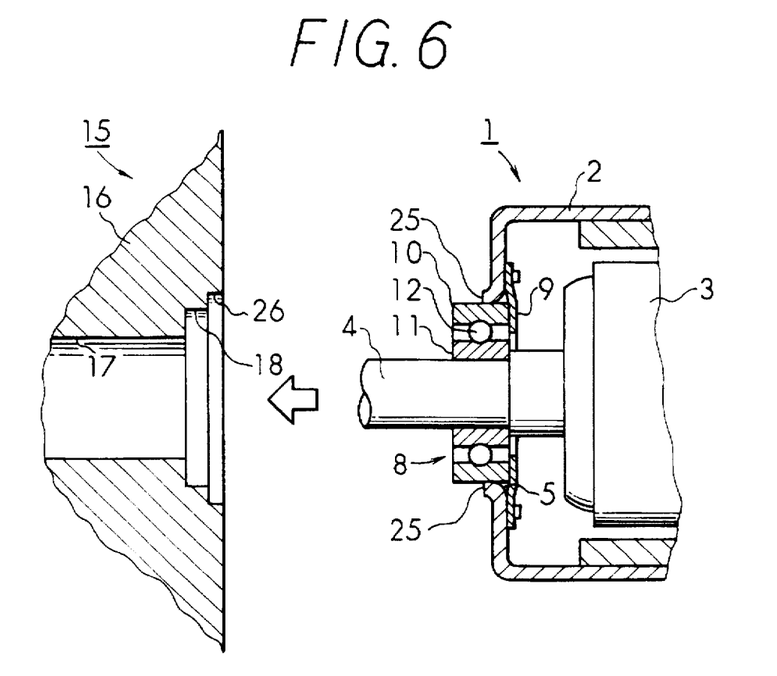
FIG. 6 is a sectional view which depicts a motor housing and actuator housing according to the second embodiment.

As shown by FIG. 6, the through hole 5 is formed on the body case 2 of motor 1 and a ring-shaped restrictor piece 25 protrudes toward the outside of motor 1 from the outside opening of through hole 5. The output shaft 4 of motor 1 is inserted in the through hole 5 and the radial bearing 8 is disposed between the output shaft 4 and the restrictor piece 25. In addition, the radial bearing 8 is supported at the side section of motor 1 with the restrictor piece 25 and the side section of actuator 15 is exposed at the outside of motor 1.

On the other hand, the insert hole 17 to be inserted with the output shaft 4 of motor 1 is formed on the housing 16 of actuator 15 and the insert hole 17 extends to the input shaft, which is not shown, of actuator 15. At the outside opening of insert hole 17, the engaging recess 18 which has the same diameter as the radial bearing 8 with the difference within the range of a few scores of microns, is formed. In addition, at the outside opening of engaging recess 18, the accommodating recess 26 which has a larger diameter than the abovementioned engaging recess 18, is formed. The accommodating recess 26 is formed a little larger than the restrictor piece 25 to accommodate the restrictor piece 25.

The engaging recess 18 is designed to be fitted with the radial bearing 8. In addition, when the engaging recess 18 and the radial bearing 8 are engaged, the output shaft 4 of motor 1 is connected to the input shaft of actuator 15 in the optimum condition. In other words, the internal peripheral surface of the engaging recess 18 is finished with high precision relative to the radial bearing 18 and, when the motor 1 is mounted on the actuator 15, the output shaft 4 of motor 1 is designed to be connected to the input shaft in the optimum condition.

Figure 7:
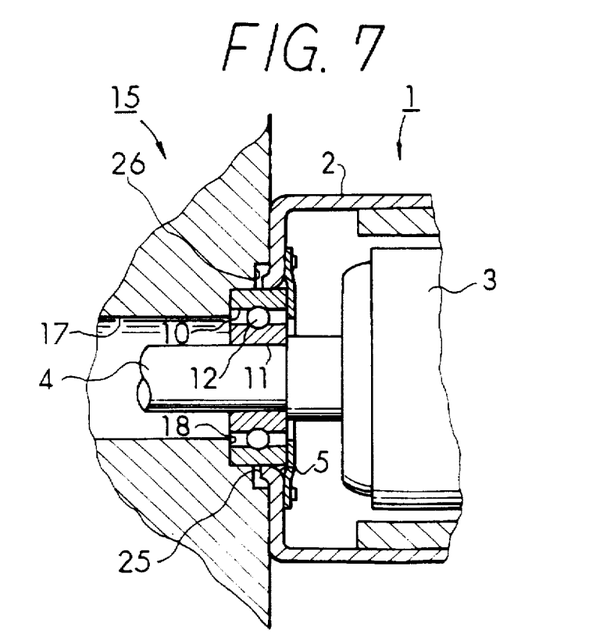
FIG. 7 is a sectional view which shows the way in which the motor and the actuator of the second embodiment are mounted.

Accordingly, the motor 1 is mounted on the actuator 15 as shown by FIG. 7 by inserting the output shaft 4 of motor 1 in the insert hole 17 of actuator 15 and fitting the radial bearing 8 in the engaging recess 18. At this time, the restrictor 25 is accommodated in the accommodating recess 26 so that it will not disturb the engagement of outer ring 10 and engaging recess 18.

As described above, in this embodiment, the motor 1 is mounted on the actuator 15 by fitting the radial bearing 8, which have already been finished with high precision in the engaging recess 18 which has been finished with high precision relative to the radial bearing 8. Therefore, when the motor 1 is mounted on the actuator 15, the central axial line of output shaft 4 can be maintained at the optimum axial line position.

Moreover, since the radial bearing 8, which have already been finished with high precision, is fitted in the engaging recess 18, the motor 1 can be positioned and connected without finishing the external peripheral surface of joint section of body case 2 with high precision and also without error. As a result, the manufacturing cost of motor 1 can be reduced.

Further, since, in this embodiment, the load borne by the radial bearing 8 is supported with the housing 16 of actuator 15 in the same manner as in the conventional method, the strength to mount the motor 1 can be maintained notwithstanding the low manufacturing cost of motor 1.

In addition, since, in this embodiment, the side section of actuator 15 of radial bearing 8 is fitted in the engaging recess 18, a larger engaging surface can be secured. Accordingly, when the motor is mounted on the actuator 15, the central axial line of output shaft 4 can be maintained more accurately at the optimum axial line position.

Next, third embodiment of the present invention is described with reference to FIG. 8 through FIG. 10. The same numerals are assigned to the same sections as in the first and second embodiments of the present invention and detailed explanation is abbreviated.

Figure 8:
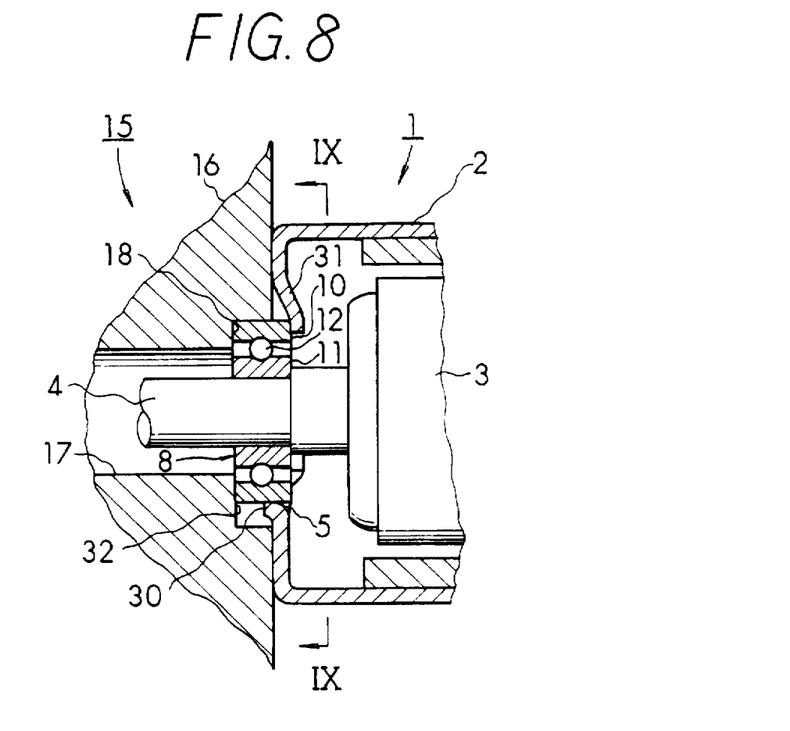
FIG. 8 is a sectional view which shows the way in which the motor and the actuator according to third embodiment are mounted.
Figure 9:
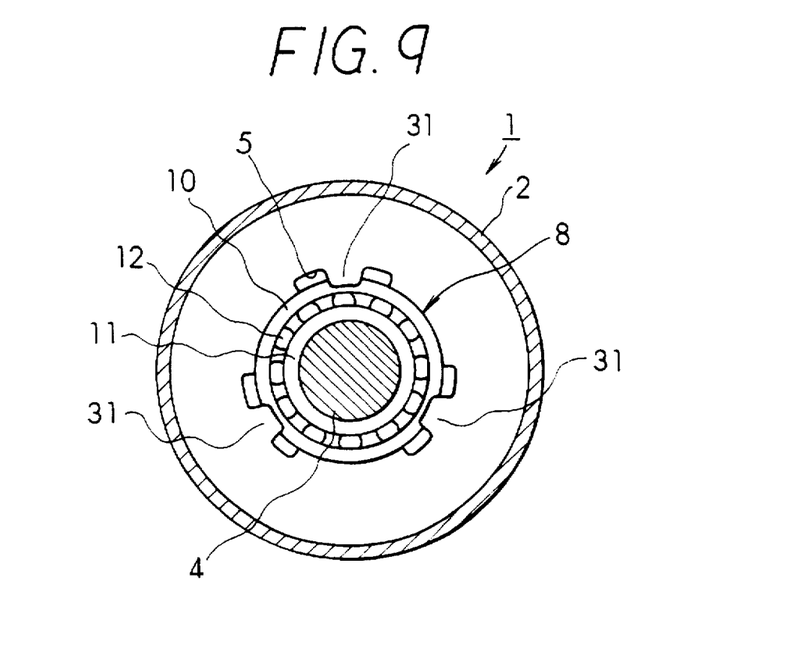
FIG. 9 is a sectional view taken along the line IX—IX in FIG. 8.
Figure 10:
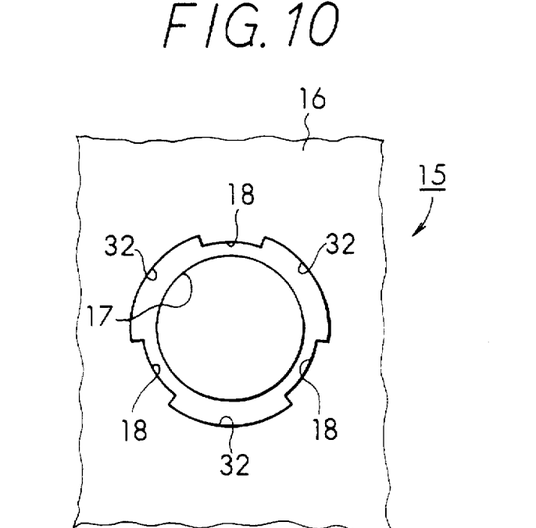
FIG. 10 is a front elevation of the insert hole and the engaging recess as well as the accommodating groove of third embodiment.

As shown by FIG. 8 and FIG. 9, the through hole 5 is formed on the body case 2 of motor 1 and, on the outside opening of through hole 5, three restrictor pieces 30 which are disposed with the specified interval protrude toward the outside of motor 1. Output shaft 4 of motor 1 is inserted in the through hole 5 and the radial bearing 8 is disposed between the output shaft 4 and the restrictor pieces 30.

Further, the radial bearing 8 is supported at the side section of motor 1 with each restrictor piece 30. In addition, between respective restrictor pieces 30 at the outside opening of through hole 5, a stopper piece 31 protrudes. The stopper piece 31 is formed so that its end is brought to the position at the inner side section of outer ring 10 so that the outer ring 10 is prevented from being displaced to the inner side of motor 1 by the stopper piece 31.

On the other hand, the insert hole 17 to be inserted with the output shaft 4 of motor 1 is formed on the housing 16 of actuator 15 and the insert hole 17 extends to the input shaft, which is not shown, of actuator 15. At the outside opening of insert hole 17, the engaging recess 18 which has the same diameter as the radial bearing 8 with the difference within the range of a few scores of microns, is formed, and three accommodating grooves 32 are formed at the positions corresponding to the restrictor pieces 30 on the internal peripheral section of engaging recess 18. These accommodating grooves are formed a little larger than the restrictor pieces 30 enabling to accommodate the restrictor pieces 30.

Radial bearing 8 is fitted in the abovementioned engaging recess 18 and, when the engaging recess 18 and the radial bearing 8 are engaged each other, the output shaft 4 of motor 1 is connected to the input shaft, not shown, of actuator 15 in the optimum condition. In other words, the internal peripheral surface of the engaging recess 18 is finished with high precision relative to each radial bearing 8 and,. when the motor 1 is mounted on the actuator 15, the output shaft 4 of motor 1 is designed to be connected to the input shaft in the optimum condition.

Accordingly, the motor 1 is mounted on the actuator 15 by inserting the output shaft 4 of motor 1 in the insert hole 17 of actuator 15 and by fitting the radial bearing 8 in the engaging recess 18. At this time, since the restrictor pieces 30 are accommodated in the accommodating grooves 32, the engagement between the radial bearing 8 and the accommodating recess 18 will not be disturbed.

As described above, in this embodiment, the motor 1 is mounted on the actuator 15 by fitting the radial bearing 8 which have already been finished with high precision in the engaging recess 18 which has been finished with high precision relative to the radial bearing 8. Therefore, when the motor 1 is mounted on the actuator 15, the central axial line of output shaft 4 can be maintained at the optimum axial line position.

Moreover, since the radial bearing 8 which have already been finished with high precision is fitted in the engaging recess 18, the motor 1 can be positioned and connected without finishing the external peripheral surface of joint section of body case 2 and also without error. As a result, the manufacturing cost of motor 1 can be reduced.

In addition, since, in this embodiment, the load borne by the radial bearing 8 is supported with the housing 16 of actuator 15 in the same manner as in the conventional method, the strength to mount the motor 1 can be maintained notwithstanding the low manufacturing cost of motor 1.

Moreover, in this embodiment, three stopper pieces 31 are protruded from the through hole 5 and the stopper pieces 31 are designed to form so that the ends of stopper pieces 31 are brought to the axial inner side section of outer ring 10. Accordingly, it is not necessary to provide the stopper plate at the inside opening of through hole 5 so that the number of parts can be reduced. Since the number of parts can be reduced, the motor can be manufactured with less cost.

Next, the fourth embodiment of the present invention is described with reference to FIG. 11. The same reference numerals are assigned to the same sections as in the first, second and third embodiments and detail explanation thereof is abbreviated.

Figure 11:
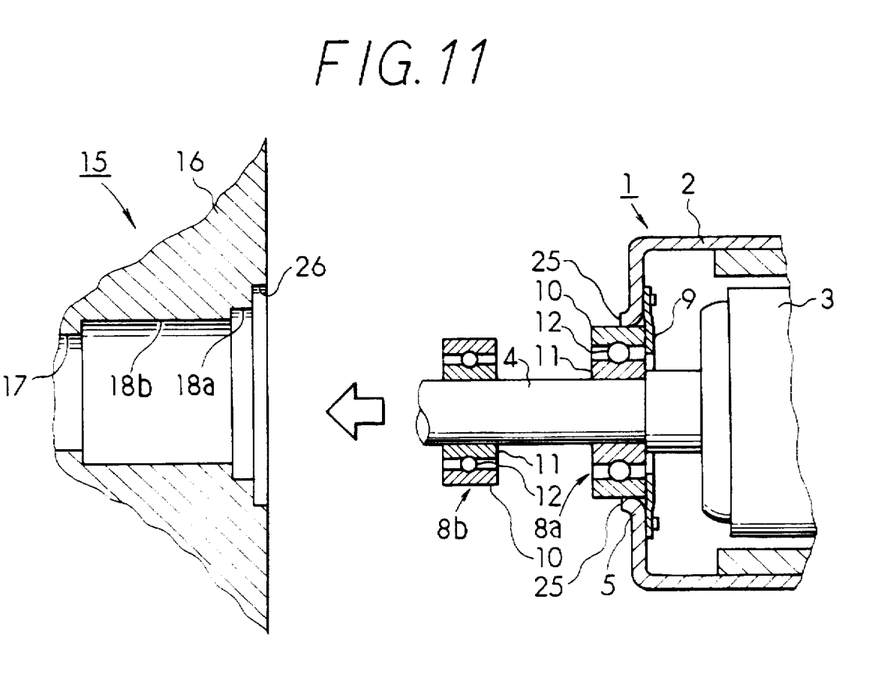
FIG. 11 is a sectional view of the motor and the actuator housing of the fourth embodiment.

As shown by FIG. 11, the through hole 5 is formed on the body case 2 of motor 1 and, from the outside opening of through hole 5, the ringed restrictor piece 25 protrudes toward the axial outside of motor 1. Output shaft 4 of motor 1 is inserted in the abovementioned through hole 5 and first radial bearing 8a is disposed between the output shaft 4 and the restrictor piece 25. In addition, the first radial bearing 8a is supported at the side section of motor 1 with the restrictor piece 25 and the side section of actuator 15 is exposed at the outside of motor 1.

Further, on the output shaft 4, second radial bearing 8b is disposed separated axially from the first radial bearing 8a at a specified distance. The second radial bearing 8b is composed of outer ring 10, inner ring 11 and balls 12 in the same manner as the first radial bearing 8a and the inner ring 11 is secured on the output shaft 4.

On the other hand, on the housing 16 of actuator 15, the insert hole 17 to be inserted with the output shaft 4 of motor 1 is formed and extends to the input shaft, which is not shown, of actuator 15. On the outside opening of insert hole 17, the second engaging recess 18b which has the same diameter as the second radial bearing 8b with the difference in the range of a few scores of microns, is formed. Further, on the outside opening of second engaging recess 18b, the first engaging recess 18a which has the same diameter as the first radial bearing 8a with the difference in the range of a few scores of microns, is formed. In addition, at the outside opening of first engaging recess 18a, the accommodating recess 26 which has a larger diameter than the abovementioned first engaging recess 18a, is formed. The accommodating recess 26 is formed a little larger than the restrictor piece 25 so as to accommodate the restrictor piece 25 therein.

In the first engaging recess 18a, the first radial bearing 8a is inserted and the second engaging recess 18b is designed to be fitted with the second radial bearing 8b. In addition, when each engaging recess 18a and 18b and each radial bearing 8a and 8b are engaged each other, the output shaft 4 of motor 1 is connected to the input shaft, not shown, of actuator 15. In other word, the internal peripheral surface of each engaging recess 18a and 18b is finished with high precision relative to each radial bearing 8a and 8b and, when the motor 1 is mounted on the actuator 15, the output shaft 4 of motor 1 is connected to the input shaft of motor 1 in the optimum condition.

Accordingly, the motor 1 is mounted on the actuator 15 by inserting the output shaft 4 of motor 1 in the insert hole 17 of actuator 15, by fitting the second radial bearing 8b in the second engaging recess 18b and also by fitting the first radial bearing 8a in the first engaging recess 18a. The restrictor 25 is accommodated in the accommodating recess 26 so that it is designed not to disturb the engagement between the first radial bearing 8a and the first engaging recess 18a.

As described above, the motor 1 is mounted on the actuator 15 by fitting each radial bearing 8a and 8a which have already been finished with high precision in each engaging recess 18a and 18b which have been finished with high precision relative to each radial bearing 8a and 8b. Therefore, when the motor 1 is mounted on the actuator, the central axial line of output shaft 4 can be maintained at the optimum axial line position.

Further, since each radial bearing 8a and 8b which already have been finished with high precision is fitted in each engaging recess 18a and 18b, the motor 1 can be positioned and connected without finishing the external peripheral surface at the joint section of body case 2 with high precision and also without error. As a result, the manufacturing cost of motor can be reduced.

In addition, since, in this embodiment, the load borne by the first radial bearing 8a is supported with the housing 16 of actuator 15 in the same manner as in the conventional method, the strength to mount the motor can be maintained notwithstanding the low manufacturing cost of motor 1.

Moreover, in this embodiment, a pair of radial bearings 8a and 8b are provided on the output shaft 4. Therefore, when the motor 1 is mounted on the actuator 15, the output shaft 4 will not dislocate easily so that the central axial line of output shaft 4 can be maintained at the optimum axial line position with better accuracy.

In addition, since, in this embodiment, the second radial bearing 8b is provided on the output shaft (rotating shaft) 4 while the end of output shaft (rotating shaft) 4 of motor 1 opposite to the actuator 15 is supported rotatably by the radial bearing, not shown, provided on the body case 2, it is unnecessary to provide the radial bearing at the opposite side. In other words, since the output shaft (rotating shaft) 4 of motor 1 should be supported at least at two points, when the second radial bearing 8b is provided, the radial bearing which should be provided usually in the motor 1 can be abbreviated. Therefore, the structural member to engage and retain the radial bearing at the opposite side becomes unnecessary or the process of high accuracy finishing of the engaging section of the structural member is unnecessary so that the motor can be manufactured with a further low cost.

Figure 12:
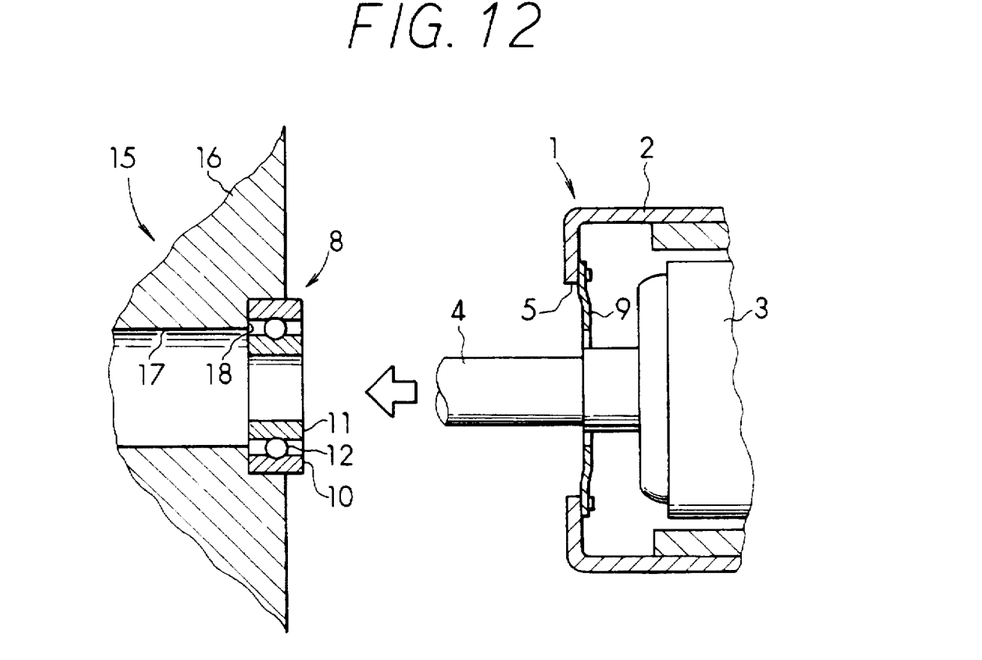
FIG. 12 is a sectional view of the motor and the actuator housing of the fifth embodiment.

Next, the fifth embodiment of the present invention is described with reference to FIG. 12. The same numerals are assigned to the same sections as in the first, second, third and fourth embodiments and detail explanation thereof is abbreviated for brevity. As shown by FIG. 12, the through hole 5 is formed on the body case 2 of motor 1 and the output shaft 4 of motor 1 is inserted in the through hole 5. Stopper plate 9 is secured at the axial side of body case 2. On the other hand, on the housing 16 of actuator 15, the insert hole 17 to insert the output shaft 4 of motor 1 is formed and the insert hole 17 extends to the input shaft, which is not shown, of actuator 15. Engaging recess 18 is formed at the outside opening of insert hole 17 and the radial bearing 8 is fitted in the engaging recess 18.

In addition, the internal peripheral surface of engaging recess 18 is finished with high precision relative to the radial bearing 8 which have already been finished with high precision usually, and the axial line position of radial bearing 8 is designed to agree with the optimum axial line position. Further, if the output shaft 4 of motor 1 is inserted in the insert hole 17 of actuator 15 via the radial bearing 8, the axial line of output shaft 4 agrees with the axial line of radial bearing 8. In other words, the central axial line of output shaft 4 becomes the optimum axial line position so that the output shaft 4 of motor 1 is connected to the input shaft, not shown, of actuator 15.

Therefore, in this embodiment, the engaging recess 18 is finished with high precision relative to the radial bearing 8 which already have been finished with high precision, and the radial bearing 8 is fitted in the engaging recess 18. Then, the motor 1 is mounted on the actuator 15 by inserting the output shaft 4 of motor 1 in the radial bearing 8 which is fitted in the engaging recess 18. Accordingly, when the motor 1 is mounted on the actuator 15, the central axial line of output shaft 4 can be maintained at the optimum axial line position.

In addition, since the motor 1 can be positioned and connected without finishing the external peripheral surface of joint section of body case 2 and also without error and, besides, the radial bearing 8 is not provided on the motor 1, the manufacturing cost of motor 1 can be reduced further.

Moreover, since, in this embodiment, the load borne by the radial bearing 8 is supported by the housing 16 of actuator 15, the strength to mount the motor 1 can be maintained notwithstanding the low manufacturing cost of motor 1.

It is apparent that the present invention is not limited to each embodiment as described above but it may also be practiced by modifying as follows.

(1) In the first embodiment, although three restrictor pieces 6 are protruding from the outside opening of through hole 5, the number of restrictors 6 may be changed if necessary. For example, the number of restrictor pieces 6 may be changed to 4, 5 or any other number.

(2) In the third embodiment, although three restrictor pieces 30 are protruding from the outside opening of through hole 5, the number of restrictor pieces 30 may be changed if necessary. For example, the number of restrictor pieces 30 may be changed to 4, 5 or any other number. Further, the number of three stoppers 3 in the third embodiment may be changed if necessary.

(3) In the fourth embodiment, although a pair of radial bearings 8a and 8b are provided on the output shaft 4 of motor 1, the radial bearings may be more than 2 pieces. In addition, although a specified space is provided between respective radial bearings 8a and 8b, this space may be eliminated.

(4) In the fourth embodiment, although the same structure of motor 1 as that in the second embodiment is employed and the second radial bearing 8b is provided on the output shaft 4 of motor 1, the present invention is not limited to these arrangements. In other words, the motor 1 may take the same structure as that of motor 1 in the first embodiment and the second radial bearing 8b may be provided on the output shaft of motor 1.

(5) In the fifth embodiment, although the engaging recess 18 is formed at the outside opening of insert hole 17 and the radial bearing 8 is fitted in the engaging recess, the present invention is not limited to this arrangement. For example, the engaging recess 18 may be formed in the insert hole 17 in the housing 16 and the radial bearing 8 may be fitted in the engaging recess 18.

6) In each embodiment the actuator 15 may be, the gear box, link mechanism, compressor, various pumps, etc., As described above, according to the invention as described, since the radial bearing which have already been finished with high precision usually is fitted directly in the engaging recess, when the motor is mounted on the external device, the section on the body case of motor which needs the high precision finishing can be eliminated while the axial line of output shaft is maintained at the optimum axial line position. As a result, there is an excellent effect that the manufacturing cost of motor can be reduced.

Further, since the radial bearing is fitted directly in the engaging recess when the motor is mounted on the external device, the load borne by the radial bearing can be supported with the housing of external device. Consequently, the strength to mount the motor can be maintained while the motor can be manufactured with a low cost.

Further, the motor side section of radial bearing is supported with the restrictor piece and the outside device side section of radial bearing is fitted in the engaging recess. Consequently, a larger engaging surface can be reserved between the radial bearing and the engaging recess so that an excellent effect is produced that, when the motor is mounted on the external device, the axial line of output shaft can be maintained at the optimum axial line position with a better accuracy.

Further, when the motor is mounted on the external device, the output shaft of motor is supported with a plural number of radial bearings in the engaging recess. Consequently, an excellent effect is produced that the center axial line of output shaft can be maintained at the optimum axial line position further accurately.

Still further, the radial bearing which have already been finished with high precision is fitted in the engaging recess and the motor output shaft is inserted in the radial bearing in order to maintain the axial line of output shaft at the optimum axial line position. Consequently, since it becomes unnecessary to provide the radial bearing on the motor, there is an excellent effect that the manufacturing cost of motor can be reduced further.

What is claimed is:

1. Motor mounting structure comprising:
   a motor having a case, an output shaft extending axially outside said case and a radial bearing rotatably supporting said output shaft, at least a part of an outside diameter axially extending, radial outwardly facing surface of said radial bearing being exposed outside of said case and another part of said outside diameter axially extending, radial outwardly facing surface of said radial bearing being fitted directly in a contacting relationship with said case;
   an external device having an engaging recess which is shaped in a form adapted to said exposed part of said outside diameter axially extending, radial outwardly facing surface of said radial bearing, said radial bearing being fitted in said engaging recess with said exposed part of said outside diameter axially extending, radial outwardly facing surface of the radial bearing directly contacting an inner surface of said engaging recess so that said motor is mounted on said external device, with said another part of said outside diameter axially extending, radial outwardly facing surface of said radial bearing being held by said case.

2. Motor mounting structure as claimed in claim 1, wherein said motor further has:
   a restrictor piece extending from said case for securing said radial bearing; and
   said exposed part of said outside diameter axially extending, radial outwardly facing surface of said radial bearing being provided by a slit formed on said restrictor piece which extends in the same direction as said output shaft.

3. Motor mounting structure as claimed in claim 1, wherein said motor further has:
   a restrictor piece extending from said case for supporting said radial bearing only at a side section of said motor so that an end portion of said radial bearing constitutes said exposed part of said outside diameter axially extending, radial outwardly facing surface of said radial bearing.

4. Motor mounting structure as claimed in claim 1, wherein said motor further includes:
   a stopper piece extending from said case and supporting said radial bearing.

5. Motor mounting structure as claimed in claim 1, 2, 3 or 4 wherein said radial bearing is a first radial bearing, and wherein said motor further has:

a second radial bearing disposed on said output shaft in such a manner that an outside diameter axially extending, radial outwardly facing surface of said second radial bearing is exposed fully from said case at a position away from said first radial bearing, said motor being mounted on said external device with said second radial bearing being fitted in said engaging recess of said external device.

6. Motor mounting structure comprising:

an external device having a housing, an engaging recess formed in said housing, at least one accommodating groove formed in said housing that is radially larger than said engaging recess, and a radial bearing fitted in said engaging recess, said engaging recess having an inner surface and said radial bearing having a radially outer peripheral surface, said radially outer peripheral surface of said radial bearing being in contact with said inner surface of said engaging recess; and a motor having a case and a restrictor which extends integrally from said case and directly supports therein said radial bearing, said motor further having an output shaft that is inserted into said radial bearing so that said motor is mounted on said external device, said restrictor being received in said accommodating groove.

7. Motor mounting structure comprising:

an external device having a housing, an engaging recess formed in said housing, at least one accommodating groove formed in said housing that is radially larger than said engaging recess, and a radial bearing fitted in said engaging recess, said engaging recess having an inner surface and said radial bearing having a radially outer peripheral surface, said radially outer peripheral surface of said radial bearing being in contact with said inner surface of said engaging recess; and a motor having an output shaft that is inserted into said radial bearing so that said motor is mounted on said external device, said motor including a case and a restrictor extending integrally from said case and directly supporting therein said radial bearing, said restrictor being received in said accommodating groove, said motor further having a hole through which said output shaft extends, at least a part of said radially outer peripheral surface of said radial bearing being exposed outside said case, and a stopper extending radially from said case and contacting one axial end of said radial bearing in an axial direction at a side of the said motor.

8. A motor-actuator structure comprising:

a motor having a case with a side wall portion, an armature rotatably housed in said case, and an output shaft rotatable with said armature and extending outside said case through said side wall portion;

an actuator having a housing formed with an engaging recess for receiving said output shaft; and a bearing fitted into said engaging recess in radially direct contacting engagement with said housing and rotatably supporting said output shaft, said bearing being further fitted with said case in radially direct contacting engagement with said case so that said bearing is directly supported by both said housing and said case.

9. A motor-actuator structure according to claim 8, wherein said bearing extends axially outside said side wall portion of said case in a direction opposite said armature.

10. A motor-actuator structure according to claim 9, wherein said actuator has an accommodating groove disposed coaxially with said engaging recess and larger in diameter than said engaging recess for receiving a part of said case extending axially away from said armature.

11. A motor-actuator structure according to claim 10, wherein said accommodating groove has an inner diameter that is larger than an outer diameter of said part of said case extending axially away from said armature.

12. A motor-actuator structure comprising:

a motor having a case with a side wall portion, an armature rotatably housed in said case, and an output shaft rotatable with said armature and extending outside said case through said side wall portion;

an actuator having a housing formed with an engaging recess for receiving said output shaft;

a bearing fitted into said engaging recess in radially direct contacting engagement with said housing and rotatable supporting said output shaft;

said housing of said actuator is formed with at least one accommodating groove that is radially larger than said engaging recess; and said side wall portion of said case has at least one restrictor extending axially over said bearing and radially exposing at least a part of said bearing, said at least one restrictor being received in said at least one accommodating groove.

13. A motor-actuator structure according to claim 12, wherein:

said at least one accommodating groove includes a plurality of accommodating grooves disposed at spaced apart locations around said engaging recess; and said at least one restrictor includes a plurality of restrictors disposed at spaced apart locations around said bearing in correspondence to said locations of said accommodating grooves.

14. A motor-actuator structure according to claim 12, wherein:

said engaging recess and said at least one accommodating groove are formed coaxially.

15. A motor-actuator structure according to claim 12, further comprising:

a stopper fixed to an inside of said wall portion of said case and holding said bearing together with said at least one restrictor.

* * * * *